April 6, 1926.

C. S. CRICKMER

TUBING CLAMP

Filed Sept. 27, 1924

1,579,648

2 Sheets-Sheet 1

Inventor
C. S. Crickmer

By Jack A. Ahly

Attorney

April 6, 1926.  
C. S. CRICKMER  
TUBING CLAMP  
Filed Sept. 27, 1924    2 Sheets-Sheet 2
1,579,648
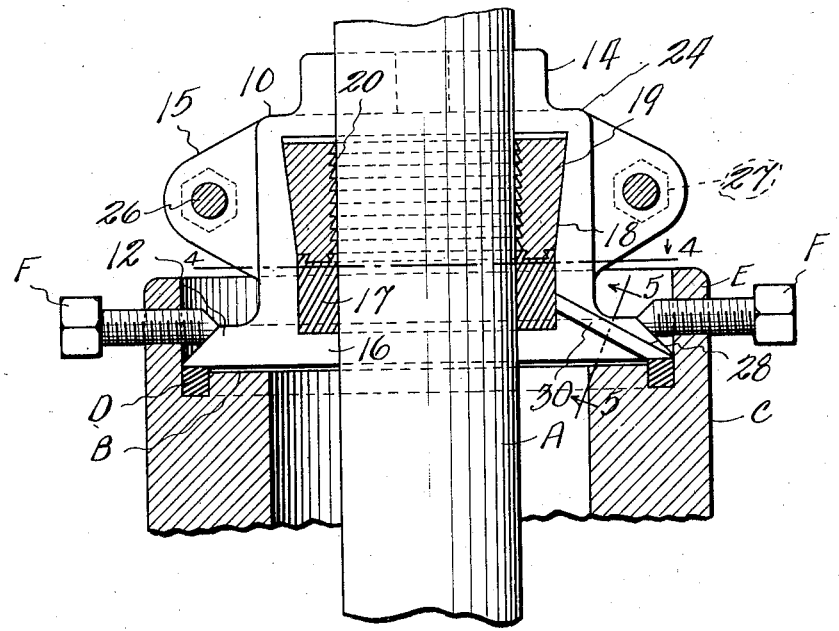
Fig. 3.
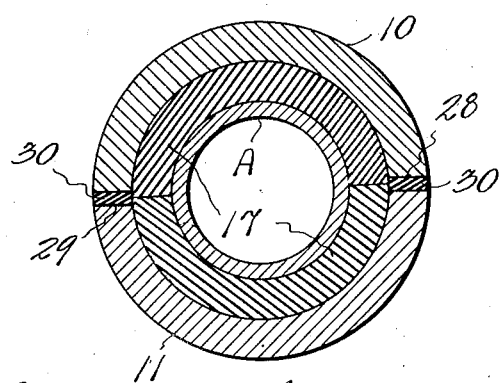
Fig. 4.
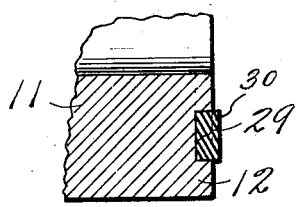
Fig. 6.
Fig. 5.
Inventor  
C. S. Crickmer
By Jack A. Ochley  
Attorney Patented Apr. 6, 1926.

1,579,648

UNITED STATES PATENT OFFICE.

CHARLES S. CRICKMER, OF DALLAS, TEXAS, ASSIGNOR TO THE GUIBERSON CORPORATION, OF DALLAS, TEXAS, A CORPORATION OF DELAWARE.

TUBING CLAMP.

Application filed September 27, 1924. Serial No. 740,294.

*To all whom it may concern:*

Be it known that I, CHARLES S. CRICKMER, citizen of the United States of America, residing at Dallas, in the county of Dallas and State of Texas, have invented certain new and useful Improvements in Tubing Clamps, of which the following is a specification.

This invention relates to new and useful improvements in tubing clamps.

It is customary to mount a control head on the upper end of a well casing and to clamp the tubing at the top of the head. Various clamps have been evolved and used, but all of those now in common use leak oil and gas and keep the clamp and head covered with oil as well as promoting a sloppy condition around the well.

The object of the invention is to provide a clamp having effectual packing elements, whereby the leakage of oil and gas is eliminated and the head and clamp are kept clean.

Another object is to provide means co-acting with the tubing to utilize the weight thereof to compress a packing about the tubing.

A further object is to provide means for increasing the compression of the packing after it has been set by the weight of the tubing.

A still further object is to provide in a two-piece clamp, packing elements for the joints between the complementary parts of the clamp, so that leakage at these points is eliminated.

An important feature resides in a rest upon the upper end of the clamp for sustaining the down thrust of collars and couplings and protecting the compression screws.

A construction designed to carry out the invention will be hereinafter described together with other features of the invention.

Figure 1:
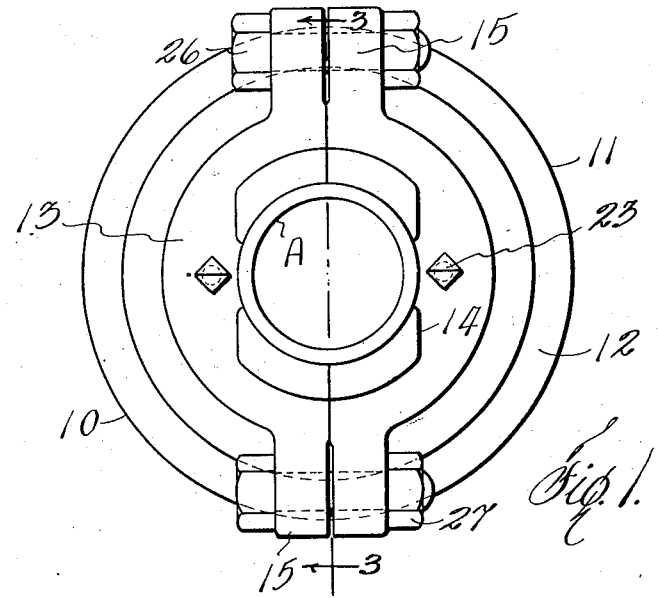
Figure 2:
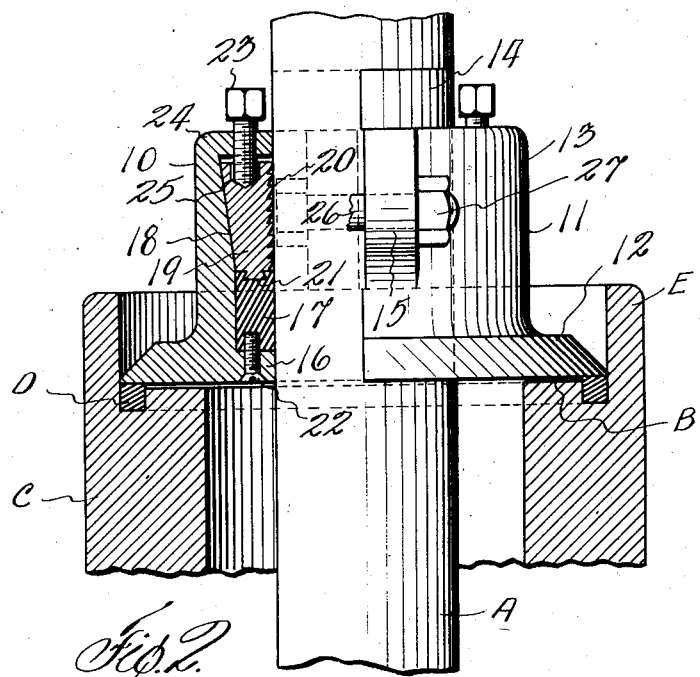

The invention will be more readily understood from a reading of the following specification and by reference to the accompanying drawings, in which an example of the invention is shown, and wherein:

Fig. 1 is a plan view of a clamp constructed in accordance with my invention,

Fig. 2 is a vertical sectional view showing the clamp in position on the upper end of a control head, a portion of the clamp being in elevation, Fig. 3 is a vertical sectional view on the line 3—3 of Fig. 1, Fig. 4 is a cross-sectional view on the line 4—4 of Fig. 3, Fig. 5 is an enlarged sectional view on the line 5—5 of Fig. 3, and Fig. 6 is a sectional view of the packing joint on the diametrically opposite side of the complementary clamp member.

In the drawings the numeral 10 designates one of the half members of the clamp and 11 the complementary member thereof; said members forming a circular clamp for surrounding a well tubing. Each member is formed with a bevelled base flange 12 and an upright collar portion 13 surmounted by bosses 14 on each side. Each collar has outwardly extending ears 15 and an inwardly extending base lip 16. The lips 16 form seats for packing sectors 17 made of rubber or other packing material suitable for the purpose.

Above the sectors the collar portions 13 are formed with outwardly inclined walls 18 providing cavities for slips 19 having teeth 20 on their arcuate faces. The slips are fastened to the sectors by a dove-tail key 21 or in any other suitable means. The parts 12, 13, 16, 17 and 19 are semi-circular and when assembled in the clamp, form annular or circular elements.

The packing sectors 17 are fastened to lips 16 by screws 22, so as to be retained in the collars when the clamp is divided. Set screws 23 are threaded in flanges 24 over the slips and have their lower ends bearing in notches 25 in said slips. The ears 15 are connected by bolts 26 and nuts 27.

The clamp is secured about the tubing A upon the usual shoulder B in the upper end of the control head C. The flange 12 rests upon a packing gasket D embedded in the shoulder. The head has an upright annular flange E. Clamp screws F threaded in the flange E have their conical ends engaging the inclined face of the base flange 12, whereby the clamp is held firmly and forced down upon the gasket D.

The teeth 20 of the slips 19 will be engaged by the tubing and to assure such engagement the slips may be forced down the inclined wall 18 by the compression screws 23, but this will not be necessary under ordinary conditions. However to compress the packing sectors 17 the slip must be moved downward and this will be accomplished by the load imposed when the tubing becomes suspended by the slips. Should still further compression of the sectors be necessary the screws 23 may be adjusted to force the slips down the wall 18.

The sectors 17 will be compressed about the tubing and the flange 12 will be forced down upon the gasket D, so that fluid cannot leak at these points. There would be a slight opening at each side where the clamp members join. To preclude leaking at these points is one of the objects of the invention. In the face at one end of the clamp member 10, I cut an inclined angular seat 28, (Figs. 3, 4 and 5) while on the face of the diametrically opposite end of the other clamp member 11, I cut a similar groove 29 (Figs. 4 and 6). In these grooves are embedded elongated angular packing strips 30 of rubber or other suitable material. The grooves and strips extend from the outer edge of the flange 12 up to the packing sectors 17 and project from the faces of the members in which they are seated. When the clamp members are brought together around the tubing the packing strips will be compressed between the ends thereof and leakage at this point will be eliminated.

Various changes in the size and shape of the different parts, as well as modifications and alterations may be made within the scope of the appended claims.

What I claim, is:

1. In a tubing clamp, complementary members, packing sectors mounted in said members, toothed slips mounted in the members and resting upon said sectors, and a laterally disposed cover enclosing the slips and extended from the upper ends of said members to engage the tubing.

2. In a tubing clamp, complementary members each having a semi-cylindrical cavity with an inclined wall at its upper end and a lateral portion disposed to engage the tubing, semi-cylindrical packing sectors fitting in the lower portions of the cavities, and inclined slips located within the lateral portions and having interior toothed faces fitting the upper inclined portions of the members and resting upon the sectors.

3. In a tubing clamp, complementary members each having a semi-cylindrical cavity with an inclined wall at its upper end, semi-cylindrical packing sectors fitting in the lower portions of the cavities, and inclined slips having interior toothed faces fitting the upper portions of the members and resting upon the sectors, the sectors and the slips being attached to each other.

4. In a tubing clamp, complementary members, each having an inclined base flange and an inwardly directed lip, a compressible packing sector mounted upon the lip of each member, a toothed slip mounted upon the sector in each member, each member having a flange overhanging the slip, a compression screw in the flange of each member bearing upon the slip thereof, and means for fastening the members together.

5. In a tubing clamp, complementary members, each having an inclined base flange and an inwardly directed lip, a compressible packing sector mounted upon the lip of each member, a toothed slip mounted upon the sector in each member, each member having a flange overhanging the slip, a compression screw in the flange of each member bearing upon the slip thereof, packing strips embedded in the ends of the members, and means for fastening the members together.

6. In a tubing clamp, complementary members having inclined walls and upper enclosing portions, lips on the members, compressible packing sectors mounted on the lips, toothed slips mounted on the sectors and having inclined backs engaging the inclined walls of the members, means carried by the enclosing portions for forcing the slips down the inclined walls to compress the packing sectors, and means for fastening the members together.

7. In a tubing clamp, complementary members having inclined walls, lips on the members, compressible packing sectors mounted on the lips, toothed slips mounted on the sectors and having inclined backs engaging the inclined walls of the members, means for forcing the slips down the inclined walls to compress the packing sectors, and inclined packing strips between the members extending from the sectors to the lower outer edge of the clamp.

8. In a tubing clamp, the combination with a control head having a packing gasket surrounded by an upstanding flange, of complementary clamp members, inclined base flanges on the members resting upon the gasket within the upstanding flange of the head, set screws in the upstanding flange having their ends engaging the inclined base flanges, packing sectors in the members, tubing slips in the members resting upon the sectors, packing elements between the members on each side of the sectors, and means for fastening the members together.

In testimony whereof I affix my signature.

CHARLES S. CRICKMER.